(12) United States Patent
Guitton (10) Patent No.: US 8,769,603 B2
(45) Date of Patent: Jul. 1, 2014

(54) METHOD FOR HANDLING OF AUDIO/VIDEO SIGNALS AND CORRESPONDING DEVICE

(75) Inventor: Xavier Guitton, Sur Illet (FR)

(73) Assignee: Thomson Licensing (FR)

( * ) Notice: Subject to any disclaimer, the term of this patent is extended or adjusted under 35 U.S.C. 154(b) by 111 days.

(21) Appl. No.: 13/136,483

(22) Filed: Aug. 2, 2011

(65) Prior Publication Data
US 2012/0036548 A1 Feb. 9, 2012

(30) Foreign Application Priority Data
Aug. 5, 2010 (EP) .................................... 10305864

(51) Int. Cl.
*H04N 7/16* (2011.01)
(52) U.S. Cl.
USPC ............ 725/151; 348/706; 725/131; 725/139
(58) Field of Classification Search
USPC ................................................ 348/706, 720
See application file for complete search history.

(56) References Cited

U.S. PATENT DOCUMENTS

| 5,438,375 | A  | * | 8/1995  | Sasabe et al.   | 348/706 |
|-----------|----|---|---------|-----------------|---------|
| 5,999,227 | A  | * | 12/1999 | Doherty et al.  | 348/564 |
| 6,441,861 | B2 | * | 8/2002  | Vaughan et al.  | 348/564 |
| 6,690,431 | B1 | * | 2/2004  | Yang et al.     | 348/706 |
| 7,911,542 | B2 | * | 3/2011  | Kim et al.      | 348/706 |
| 2004/0008972 | A1 | * | 1/2004  | Haken         | 386/83  |
| 2005/0134746 | A1 | * | 6/2005  | Brandt        | 348/705 |
| 2005/0259181 | A1 | * | 11/2005 | Watanabe      | 348/554 |
| 2005/0273813 | A1 | * | 12/2005 | Nakao         | 725/38  |
| 2007/0013816 | A1 | * | 1/2007  | Martin        | 348/730 |
| 2007/0055997 | A1 | * | 3/2007  | Witwer        | 725/81  |
| 2008/0007616 | A1 | * | 1/2008  | Baladhanday-uthapani | 348/14.12 |
| 2008/0148337 | A1 | * | 6/2008  | Laville et al.| 725/151 |
| 2009/0119732 | A1 |   | 5/2009  | Spieker et al.|         |
| 2010/0002144 | A1 | * | 1/2010  | Choi          | 348/726 |
| 2010/0095342 | A1 | * | 4/2010  | Gandhi et al. | 725/117 |
| 2010/0097528 | A1 | * | 4/2010  | Seo           | 348/726 |

FOREIGN PATENT DOCUMENTS

| EP | 1551177 | 7/2005 |
| GB | 2427778 | 1/2007 |
| WO | WO2007069851 | 6/2007 |

OTHER PUBLICATIONS

EP Search Report dated Dec. 2, 2010.

* cited by examiner

*Primary Examiner* — Fernando Alcon
(74) *Attorney, Agent, or Firm* — Jack Schwartz and Associates, PLLC (57) ABSTRACT

The present invention generally relates to a method and device for handling of audio/video signals originating from a mix of analog and digital sources of audio/video signals. In particular, the present invention relates to optimization of hardware resources and of wiring needed for the interconnection of various analog and digital sources of audio/video signals.

10 Claims, 6 Drawing Sheets

METHOD FOR HANDLING OF AUDIO/VIDEO SIGNALS AND CORRESPONDING DEVICE

This application claims the benefit, under 35 U.S.C. §119 of EP Patent Application 10305864.0, filed 5 Aug. 2010.

1. FIELD OF INVENTION

The present invention generally relates to a method and device for handling of audio/video signals originating from a mix of analog and digital sources of audio/video signals. In particular, the present invention relates to optimization of hardware resources and of wiring needed for the interconnection of various analog and digital sources of audio/video signals.

2. TECHNICAL BACKGROUND

Manufacturers of consumer devices for reception and decoding of radio-frequency modulated audio/video signals for rendering of audiovisual services (e.g. satellite receivers, cable receivers, terrestrial receivers, digital televisions or mobile cell phones with integrated satellite, cable or terrestrial receivers), tend to minimize hardware resources of those devices in order to reduce production costs and ensure a competitive market price. In particular, processing and memory resources are tailored to the strictly needed.

While the current trend is to a full-digital consumer electronic equipment, there are still many devices in consumer households that do not comply to the latest digital interconnection standards and interfaces, such as HDMI (High-Definition Multimedia Interface). Consumers are reluctant to change perfectly functioning devices with analog audio/video inputs and outputs for new devices just because their recently bought flat-screen digital television equipment does not allow to connect their existing equipment. Therefore, manufacturers still need to supply their latest digital consumer electronic devices with additional analog audio/video inputs for backwards compatibility.

For consumers, the interconnection of the mix of analog and digital equipment, having different connection interfaces, is not easy to master and results in undesired quantity of unaesthetic and dust-retaining wiring.

There is thus a need for optimization of the interconnection of analog and digital equipment and of the hardware resources needed in digital audio/video devices to connect to existing analog audio/video devices that avoids additional and complex wiring.

3. SUMMARY OF THE INVENTION

The present invention aims at alleviating some of the inconveniences of prior art.

The invention proposes a solution for optimization of the interconnection of analog and digital audio/video devices, that avoids among others the aforementioned drawbacks of prior art solutions.

The term 'audio/video' and the abbreviation 'AV' is used in this document to indicate audio, video, or both audio and video.

The invention proposes a device for reception of digital radio frequency modulated audio/video signals, comprising a digital audio/video output interface, and a tuner comprising an analog to digital convertor, the analog to digital convertor being used for analog to digital conversion of an analog input signal that originates from either of at least two signal sources, the at least two signal sources comprising a front end of the tuner and an analog audio/video input interface, the analog input signal, after having been converted to a digital output signal by the analog to digital conversion, being at the origin of a digital audio/video signal that is output on the digital audio/video interface after further processing by said device.

In this manner, the digital audio/video signal finds its source (or 'origin') in for example either an RF modulated DVB-T signal transporting television or radio programmes, or an audio/video signal received from a DVD player via the device's analog AV interface.

According to a variant embodiment of the invention, the device further comprises a switch for selection of either one of the at least two signal sources.

According to a variant embodiment of the invention, the device further comprises a controller for controlling the switch.

According to a variant embodiment of the invention, the controller reduces power consumption of hardware components of the device that are not needed according to the selection of either of said at least two signal sources.

According to a variant embodiment of the invention, the device is a Set Top Box for reception of digital radio and television programs.

According to a variant embodiment of the invention, the digital audio/video output interface is according to a High-Definition Multi-media Interface.

According to a variant embodiment of the invention, the analog audio/video input interface is one of according to a Radio and Television Receiver Manufacturers' Association interface, also referred to as SCART, Péritel, Euro-SCART, Euroconnector, EuroAV and EIA Multiport interface;

S-Video interface; or

CINCH interface.

The invention also concerns a method for handling of audio/video signals, implemented by a device for reception of radio frequency modulated audio/video signals, the device comprising a digital audio/video output interface, the method comprising a step of selection of a source of audio/video signals for input into an analog to digital convertor for analog to digital conversion of an analog input signal that originates from either of at least two signal sources, the at least two signal sources comprising a front end of a tuner and an analog audio/video input interface, the analog input signal, after having been converted to a digital output signal by the analog to digital conversion, being at the origin of a digital audio/video signal that is output on the digital audio/video output interface after further processing by the device.

According to a variant embodiment of the method, the method comprises a step of controlling the selection through determination of a presence of a analog audio/video signal on the analog audio/video input interface, said controlling determining a connection of one of said at least two signal sources to said analog to digital conversion.

According to a variant embodiment of the method, the method comprises a step of reduction of power consumption of hardware components that are not needed in handling of those of the at least two signal sources that are not a source for the analog to digital conversion.

4. LIST OF FIGURES

The discussed advantages and other, not yet discussed advantages of the invention will appear through the following description of particular, non-restricting embodiments of the invention.

The embodiments are described with reference to the following figures.

5. DETAILED DESCRIPTION OF THE INVENTION

Figure 1:
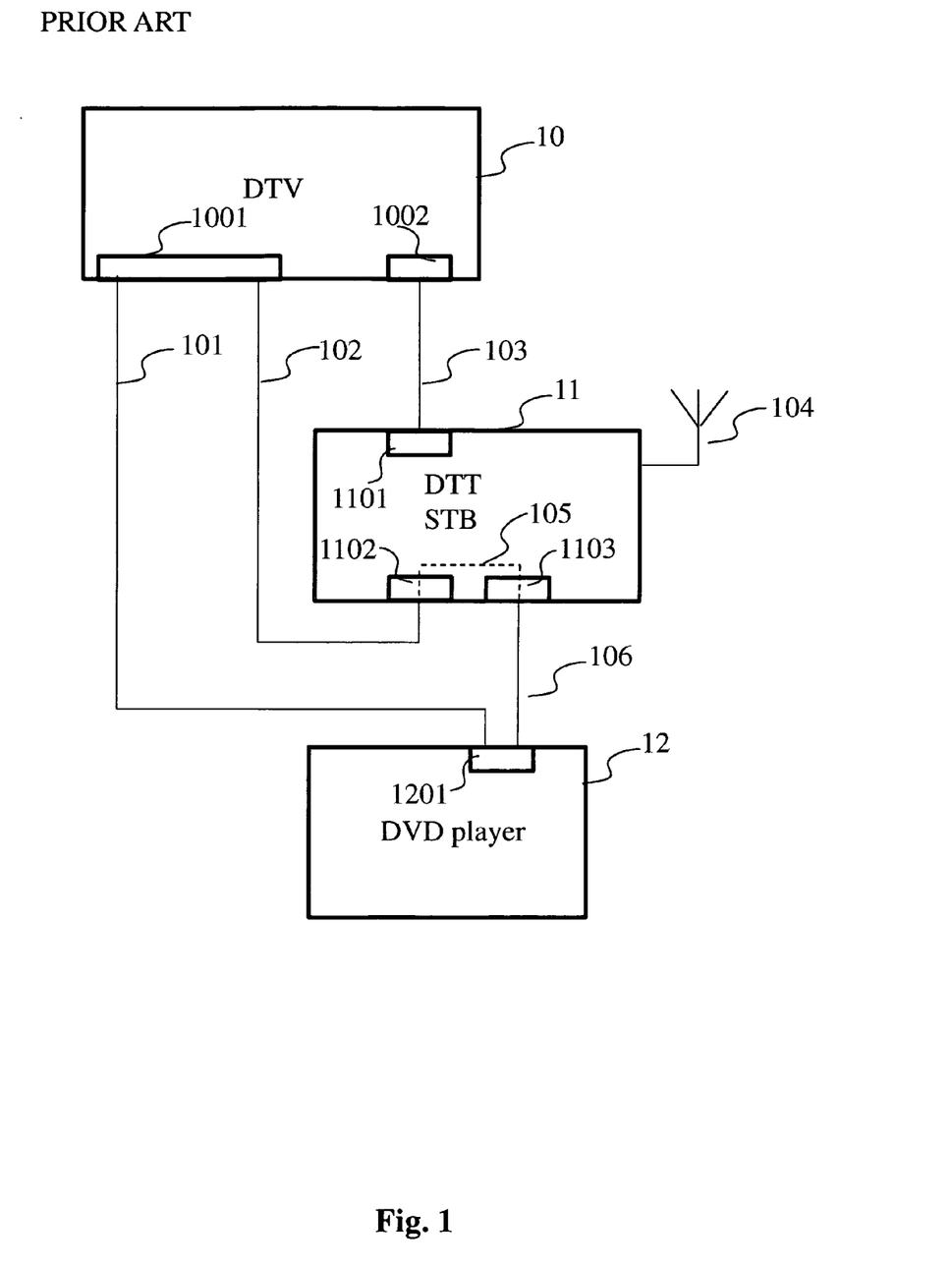
FIG. 1 shows prior-art interconnection of analog and digital audio/video devices.

FIG. 1 shows prior-art interconnection of analog and digital audio/video devices. Digital Terrestrial Television (DTT) Set Top Box (STB) 11 and a DVD player 12 are connected to a digital television 10.

DTV 10 is equipped with analog audio/video input interface 1001 and digital video input interface 1002. DTT STB 11 is equipped with a digital audio/video output interface 1101 and an analog audio/video input interface 1103 and output interlace 1102. DVD player 12 is equipped with an analog output interface 1201. For reception of a radio frequency (RF) signal, STB 11 is further connected to an antenna 104.
The figure shows several prior-art possibilities of interconnection for DVD player 12 to DTV 10; DVD player 12 can either be connected directly to DTV 10 via analog connection 101, or indirectly, via STB 11 and analog connections 106 and 102. STB 11 is connected to DTV 10 via digital connection 103. In a typical situation, the analog interfaces 1001, 1102, 1103 and 1201 are of the SCART type (from Syndicat des Constructeurs d'Appareils Radiorécepteurs et Téléviseurs, Radio and Television Receiver Manufacturers' Association), also known as Péritel, EuroSCART, Euroconnector, EuroAV and EIA Multiport interface, or of the S-Video interface type, or of the CINCH interface type (also known as RCA jack), whereas digital interfaces 1002 and 1101 are of the HDMI type (High-Definition Multimedia Interface).

Figure 2:
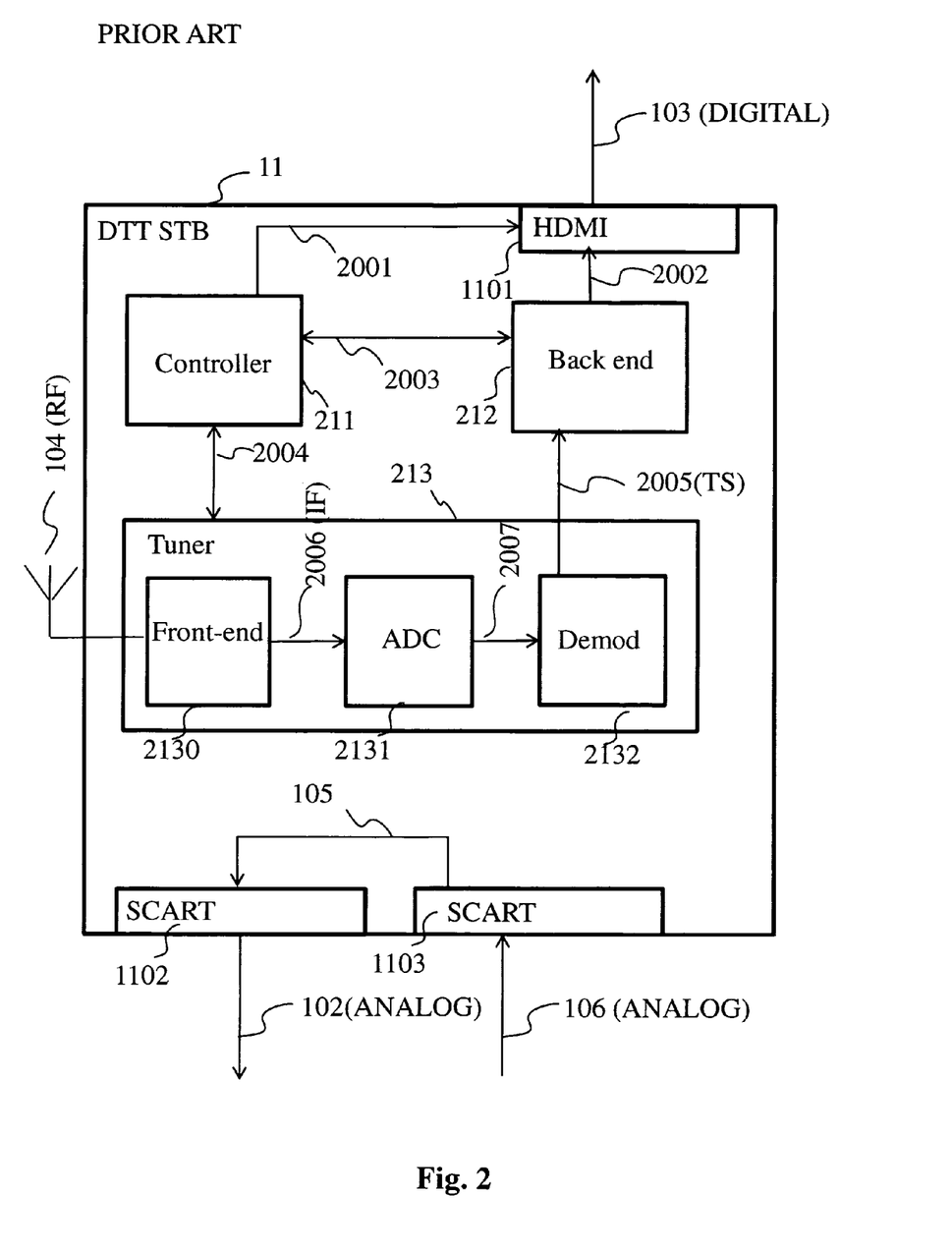
FIG. 2 shows prior-art device 11 of FIG. 1 in more detail.

FIG. 2 shows prior-art device 11 of FIG. 1 in more detail. The device 11 receives the RF signal on its antenna 104, which is handled by tuner 213 front-end 2130 where the variable frequency of the signals is converted to a fixed, lower frequency, which is then input into an analog-digital converter (ADC) 2131, and then demodulated by demodulator 2132, finally outputting a digital signal in the form of an Transport Stream (TS), such as an MPEG-TS, on tuner output 2005. The tuner front-end 2130 allows, by means of the device controller 211, to choose a particular frequency from a frequency band, which is then downconverted to a lower, fixed frequency and output on output 2006 to be input into the ADC 2131. Finally, the tuner output 2005 is connected to a back end 212 for further treatment before outputting it by means of connection 2002 to the HDMI interface 1101, which outputs a HDMI signal via connection 103. A controller manages the functioning of the equipment via connections 2001, 2003, and 2004. SCART input 1103 and SCART output are passive connectors that are interconnected via link 105. The input signal 106 is thus looped via these interfaces to output signal 102.

Figure 3:
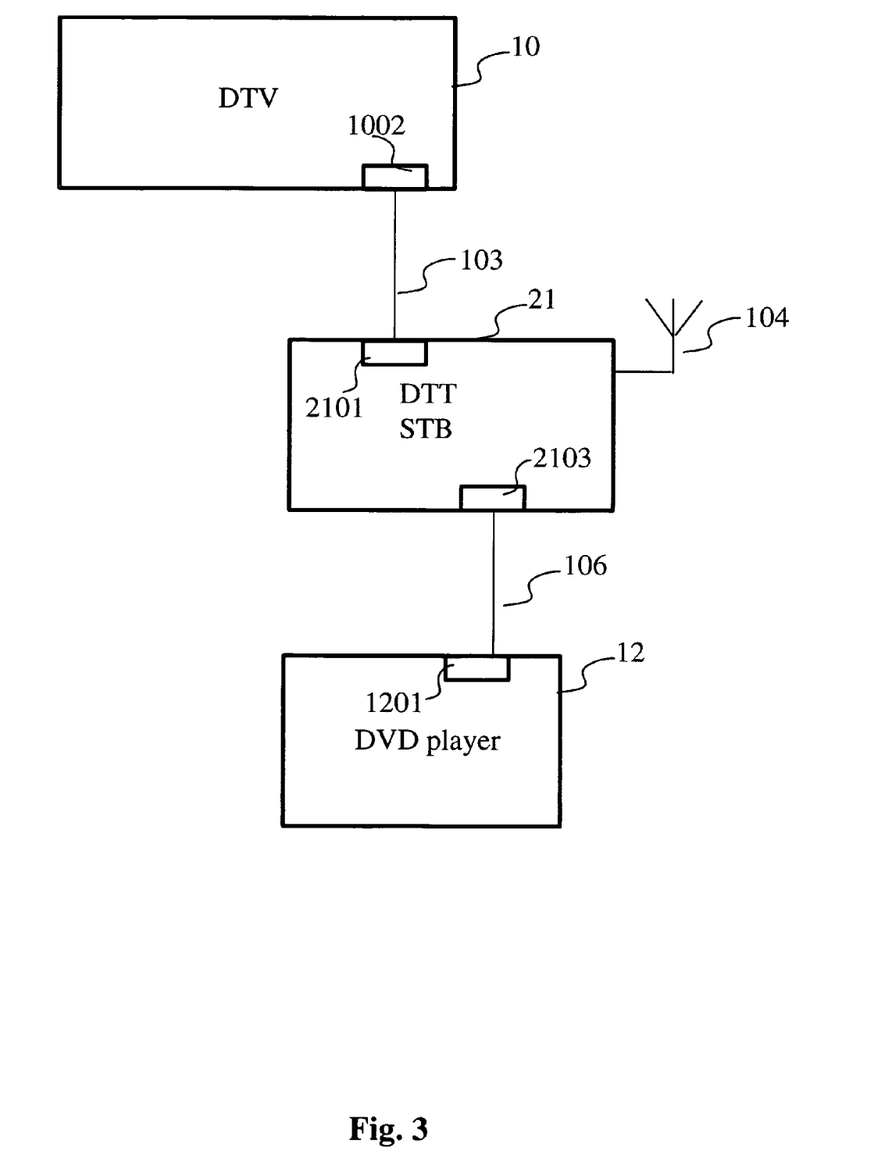
FIG. 3 shows interconnection of analog and digital audio/video devices according to the invention.

FIG. 3 shows a receiver device 21 that comprises an embodiment of the invention. Compared to prior art FIG. 1, the number of interfaces and wiring is considerably reduced. DVD player 12, with analog output interface 1201, is connected to DTV 10 via analog audio/video connection 106 that links DVD player 12 to DTT STB 21 and via a digital audio/video connection 103 that links DTT STB 21 to DTV 10. DTT STB 21 comprises an analog input interface 2103 and a digital output interface 2101. DTV 10 now needs only one digital input interface 1002. Wiring is reduced to the minimum, each device is connected via a single connection to another device.

Figure 4:
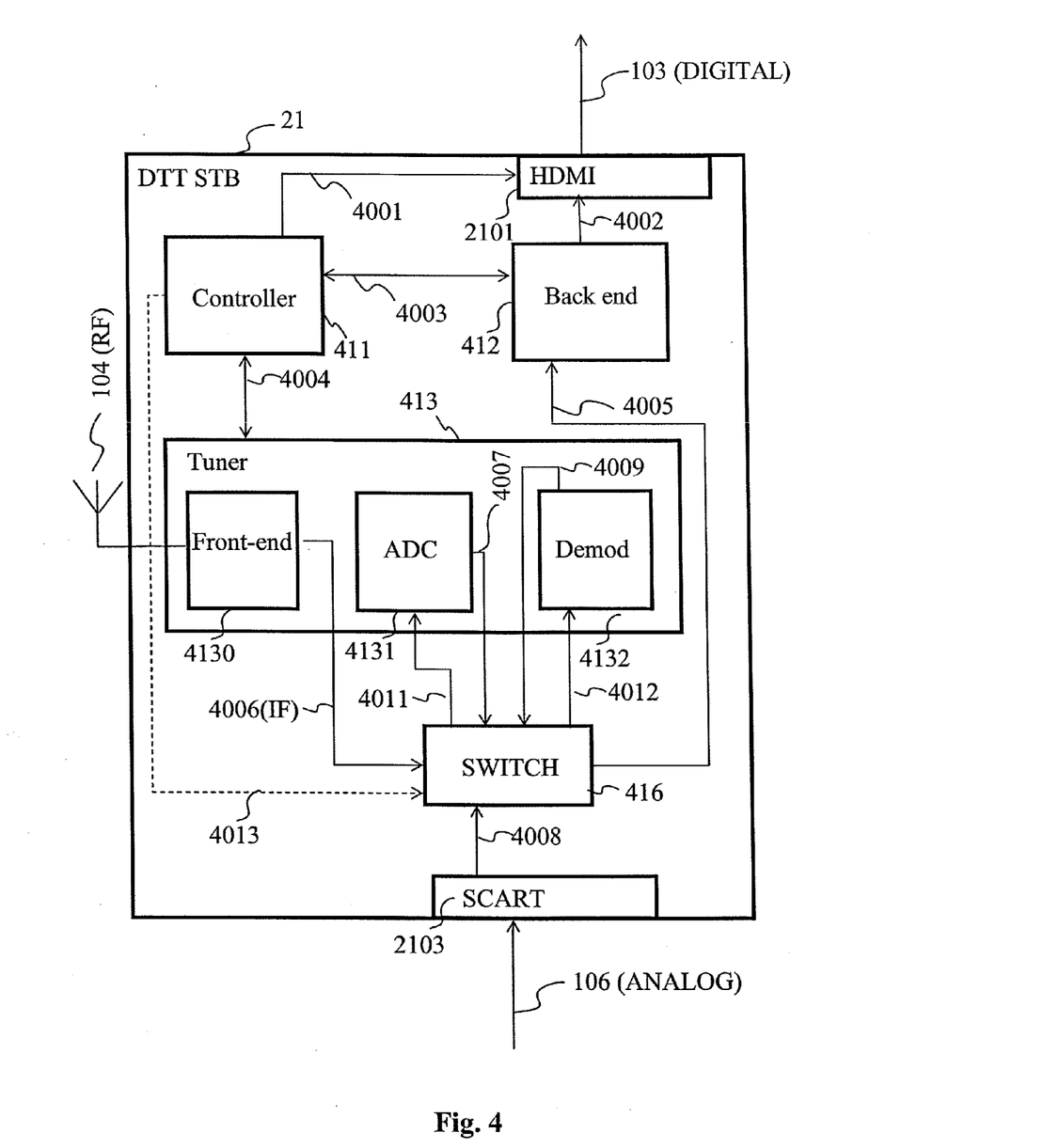
FIG. 4 shows a device 21 implementing an embodiment of the invention.

FIG. 4 diagrammatically shows an embodiment of the invention in a receiver device 21 of FIG. 3. According to the particular implementation, the invention is implemented in a DTT STB 21 of which only components are shown that are of particular relevance for explanation of the invention. Components not shown are for example, memory, data- and communication bus, internal clock, and input means for control of the device 21 by a user. The DTT STB 21 comprises at least a controller 411, a tuner 413 that comprises a front-end 4130, an analog to digital convertor (ADC) 4131, demodulator 4132; and device 21 further comprises a back-end 412, switch 416, SCART interface 2103 and HDMI interface 2101. Switch 416 is further detailed in FIG. 5. The switch 416 is controlled by controller 411. All other components are also controlled by controller 411, via connections 4001 (to/from HDMI interface 2101), 4003 (to/from Back end 412), and 4004 (to/from tuner 413). Unlike the prior art device 11 of FIGS. 1 and 2, the device 21 of the invention allows to use ADC 4131 either for the purpose of serving as an input for the demodulator 4132, or as an input for the back end 4005. In a first position of switch 416, depicted in FIG. 5, the device 21 will receive an RF signal via antenna 104, tune and downconvert it to a lower frequency (Intermediate Frequency or IF) with front end 4130, convert the analog IF signal in a digital IF signal with ADC 4131, and demodulate the digital IF signal with demodulator 4132 to finally output a digital audio/video signal 103 via back end 412 and HDMI interface 2101. In a second position of switch 416, the device will receive an analog audio/video signal 106 received via SCART interface 2103, convert it to digital signal via ADC 4131, and output a digital audio/video signal 103 via back end 412 and HDMI interface 2101. Thus, in the first position of switch 416, device 21 functions as an RF receiver. In the second position of switch 416, device 21 functions as an analog to digital converter for analog audio/video signal 106.

The backend 412 ensures further signal processing that comprises for example descrambling, extraction of information such as tables, and conversion of PAL (Phase Alternate Line) to 4:2:2.

Figure 5:
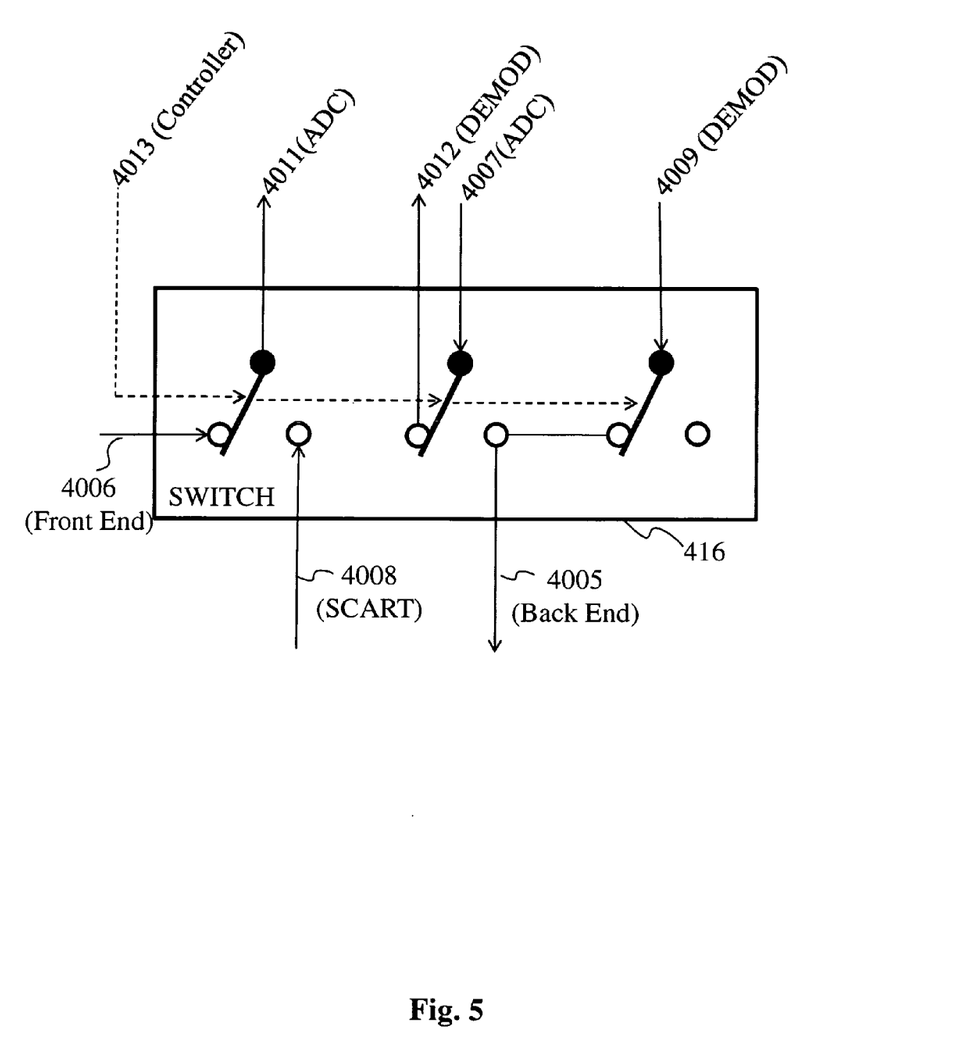
FIG. 5 shows a detailed embodiment of switch 416.

FIG. 5 shows a detailed embodiment of switch 416. The switch has two positions, a first position in which the device 21 is used as an RF receiver, and a second position in which device 21 is used as an analog-to-digital convertor of audio/video signals. The switch position that is depicted corresponds to the first position.

Although FIGS. 3 and 4 show only two possible input sources, the invention allows to reuse an existing ADC that is present in a tuner of any receiver of digital RF signals, for analog to digital conversion of analog audio/video signals originating from either of two or more signal sources, such as 3, 4, 5 or 10 input sources. The two or more signal sources comprise a front end of a tuner and an analog audio/video input interface. The analog input signal after having been converted to a digital output signal by the analog to digital conversion, is being output on the digital audio/video interface as a digital audio/video signal after further processing by said device and thus reduces in the same time the number of hardware components and wiring needed to interface the devices. ADCs are for example present in DVB-C (Digital Video Broadcasting-Cable) receivers that integrate 10 bits ADCs used for RF demodulation, which are also sufficient for analog to digital conversion of audio/video signals. Other examples of decoding standards are DVB-C2, DVB-S2 and DVB-T2 (second generation standards for Cable, Satellite and Terrestrial receivers) that require ADCs for demodulation that are sufficiently powerful for analog to digital conversion of audio/video signals. The full-band ADCs which are used in next generation RF receivers, are also largely sufficient for analog to digital conversion of audio/video signals. These full-band ADCs convert a complete RF reception band up to for example 1 GHz, and an RF receiver equipped with such a component does no longer implement a tuner function, i.e. frequency transposition of a chosen channel.

A part from the advantage procured by the invention of a double use of the ADC, the invention also allows an analog source of audio/video signals to take advantage of any additional signal handling already offered by the RF receiver device, such as video scaling (converting video signals from one size or resolution to another: usually "upscaling" or "upconverting" a video signal from a low resolution (e.g. SD or standard definition) to one of higher resolution (e.g. HDTV or high definition television). According to a variant embodiment of the invention, a device implementing the invention comprises the additional components needed for execution of these additional functions.

Another advantage of the invention, is that the particular interconnection of the devices made possible through the invention, allows for a more ergonomic operation. Whereas according to prior art wiring such as illustrated by FIG. 1 a user has to use a menu on his DTV to switch to a secondary input (for example AV1) of DTV 10 in order to render the analog audio/video signal of DVD player 12 on DTV 10, and according to a variant embodiment of the invention it is sufficient to switch off STB 21 in order to render the audio/video of DVD 12 on DTV 10, the switch 416 switching automatically to the second position when the device 21 is put to a stand-by state. According to yet another variant embodiment, the device 21 automatically puts switch 416 in the second position when a signal is detected on interface 2103. According to yet another variant embodiment, device 21 offers it's user a manual choice, for example via a button on a remote control of device 21, to choose either the first or the second position of switch 416. Device 21 can be further optimized by allowing the demodulator output, when switch 416 is in the first position, to be output on interface 106, so that the user can for example connect a DVD recorder to interface 2103 to record a programme that is received via RF.

According to a variant embodiment of the invention illustrated by this figure, the controller 411 controls the components of the receiver device 21 so that when switch 416 is put in either the first or the second position, resources not needed are switched off or put into a standby or low-power consumption mode, so that power consumption is reduced. For example, when the controller sets the switch 416 in a position to transfer audio/video signals from interface 2103 to ADC 4131, it switches off the front-end 4130 and demodulator 4132 via connection 4004. In a particular receiver implemented with a full-band ADC that executes both the functions of the front-end 4130 and ADC 4131, the full-band ADC can be configured by a controller such as controller 411 to reduce the sampling frequency in order to adapt to the analog audio/video signals of a range of 6-7 Mhz originating from the analog audio/video signal source 2103 when the full-band ADC is not used to convert RF signals. This feature helps to reduce the power consumption of the device implementing the invention.

According to a variant embodiment of the invention, the controller 411 controls any other components so as to change their parameterization or configuration. For example, when the controller sets switch 416 in the second position to transfer audio/video signals from interface 2103 to ADC 4131, it instructs the back-end 412 to do SD to HD video upscaling for the analog audio/video signal received from a DVD player such as DVD player 12 via connection 106.

According to a particular embodiment of the invention, the discussed variant embodiments can be combined to form a particularly interesting variant with the combined advantages of each individual variant.

Figure 6:
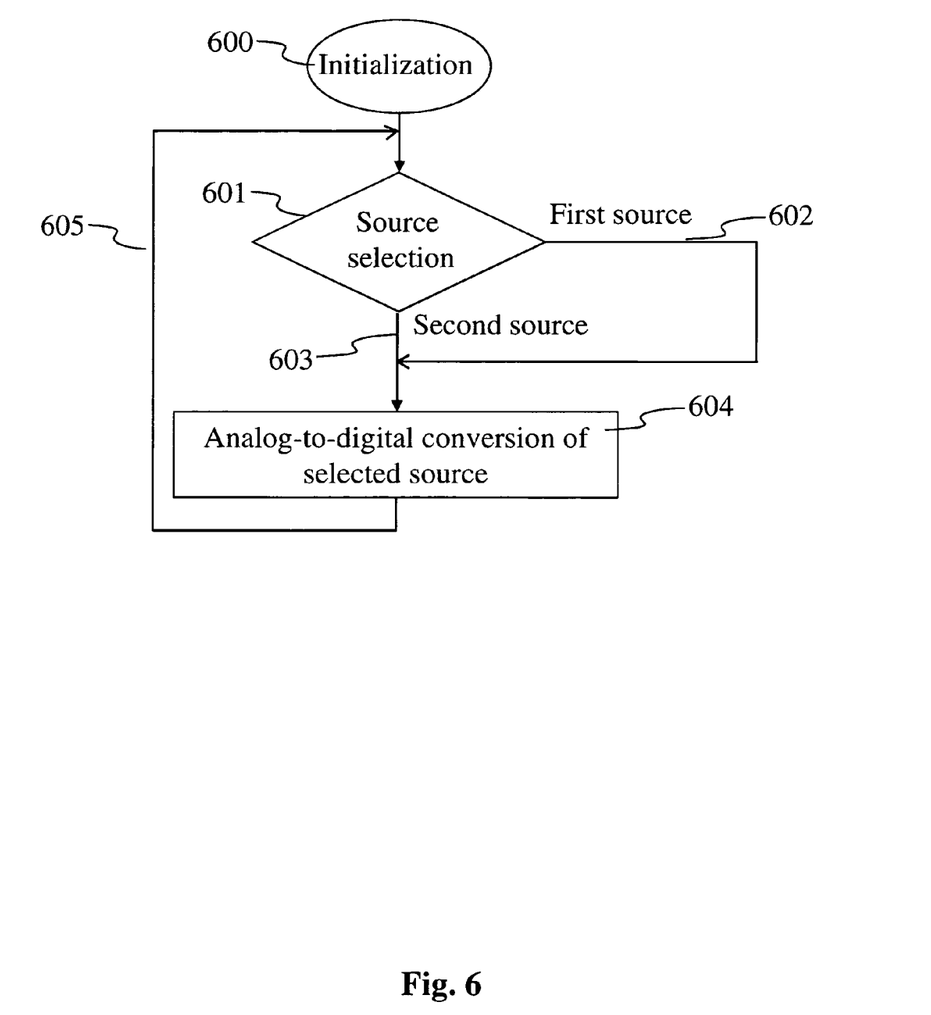
FIG. 6 shows an algorithm implementing a particular embodiment of the method of the invention, implemented for example by the receiver device 21 of FIG. 4.

FIG. 6 shows an algorithm for implementing a particular embodiment of the method of the invention, implemented for example by the receiver device 21 of FIG. 3.

In a first step 600, variables and attributes are initialized that are used by the algorithm. In a next step 601, a step of selection of a source of audio/video signals for input into an analog to digital convertor (such as ADC 4131 of FIG. 4) is done (steps 602, 603), for analog to digital conversion in a step 604 of an analog input signal (4006, 4008) that originates from either of at least two signal sources, for example such as from a tuner's 413 front end 4130 of device 21 of FIG. 4, or from an analog audio/video input interface such as SCART interface 2103 of device 21 of FIG. 4. In step 604, the analog to digital conversion is done by the analog to digital convertor of audio/video signals that is the origin of a digital audio/video signal (103) that is output on the digital audio/video output interface after any further processing.

According to a variant embodiment, the method comprises a step of controlling the selection of the source signal through detection of a presence of a signal on either from either of the sources, such as on the analog audio/video input interface 2103 of device 21 of FIG. 4. Upon such detection, the controller controls the switch 416 to change position.

According to another variant embodiment, the method further comprises a step of reduction of power consumption of hardware components that are not needed in handling of those signal sources that are not connected to the analog to digital conversion.

According to a particular embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

The invention claimed is:

1. A device for reception of digital radio frequency modulated audio/video signals, comprising an analog audio/video input interface for reception of analog non radio frequency modulated audio/video signals, a tuner comprising a front-end for receiving said digital radio frequency modulated audio/video signals and outputting said digital radio frequency modulated audio/video signals on an intermediate frequency, said device further comprising a digital audio/video output interface, an analog-to-digital converter; a demodulator and a switch, said switch connecting in a first position said tuner front-end to said analog-to-digital converter, said analog-to-digital converter to said demodulator, and said demodulator to said digital audio/video output interface, for configuring said device to function as a receiver of digital radio frequency modulated audio/video signals, and said switch connecting in a second position said analog audio/video input interface to said analog-to-digital converter and said analog-to-digital converter to said digital audio/video output interface, for configuring said device to function as an analog to digital converter for said analog non radio frequency modulated audio/video signals received on said analog audio/video input interface.

2. A device according to claim 1, wherein said device further comprises a controller for controlling said switch.

3. A device according to claim 2, wherein said controller switches off hardware components of said device that are not needed when said switch is put in either said first or said second position.

4. A device according to claim 1, wherein said device is a Set Top Box for reception of digital radio and television programs.

5. A device according to claim 1, wherein said digital audio/video output interface is according to a High-Definition Multi-media Interface.

6. A device according to claim 1, wherein said analog audio/video input interface is one of according to a
- Radio and Television Receiver Manufacturers' Association interface, also referred to as SCART, Péritel, Euro-SCART, Euroconnector, EuroAV and EIA Multiport interface;
- S-Video interface; or
- CINCH interface.

7. A method for handling of audio/video signals, implemented by a device for reception of digital radio frequency modulated audio/video signals, said device comprising an analog audio/video input interface for reception of analog non radio frequency modulated audio/video signals, a tuner comprising a front-end for receiving of said digital radio frequency modulated audio/video signals and for outputting said digital radio frequency modulated audio/video signals on an intermediate frequency, said device further comprising a digital audio/video output interface, an analog-to-digital converter, a demodulator and a switch, wherein said method comprises the following steps:
- switching said switch to a first position, said switch connecting in said first position said tuner to said analog-to-digital converter, said analog-to-digital convertor to said demodulator, and said demodulator to said digital audio/video output interface, for configuring said device to function as a receiver of digital radio frequency modulated audio/video signals;
- switching said switch to a second position, said switch connecting in said second position said analog audio/video input interface to said analog-to-digital converter and said analog-to-digital convertor to said digital audio/video output interface, for configuring said device to function as an analog to digital converter for said analog non radio frequency modulated audio/video signals received on said analog audio/video input interface.

8. A method according to claim 7, wherein said method further comprises a step of controlling said switching through determination of a presence of an analog audio/video signal on said analog audio/video input interface, said controlling determining said first position or said second position of said switch.

9. A method according to claim 8, wherein said method further comprises a step of switching off hardware components that are not needed when said switch is put in either the first or the second position.

10. A device according to claim 2, wherein said controller also controls a back-end that is connected between said switch and said digital audio/video interface, for instructing it to do video upscaling of said analog non radio frequency modulated audio/video signals received from the analog audio/video input interface.

* * * * *